United States Patent
Upadhye

(10) Patent No.: US 9,594,760 B1
(45) Date of Patent: Mar. 14, 2017

(54) SYSTEMS AND METHODS FOR ARCHIVING EMAIL MESSAGES

(75) Inventor: Mandar Upadhye, Maharashtra (IN)

(73) Assignee: Veritas Technologies, Mountain View, CA (US)

( * ) Notice: Subject to any disclaimer, the term of this patent is extended or adjusted under 35 U.S.C. 154(b) by 746 days.

(21) Appl. No.: 13/406,045

(22) Filed: Feb. 27, 2012

(51) Int. Cl.
*G06F 17/30* (2006.01)
*G06Q 10/10* (2012.01)

(52) U.S. Cl.
CPC ..... *G06F 17/30073* (2013.01); *G06Q 10/107* (2013.01)

(58) Field of Classification Search
None
See application file for complete search history.

(56) References Cited

U.S. PATENT DOCUMENTS

| | | | |
|---|---|---|---|
| 6,496,853 B1* | 12/2002 | Klein | 709/206 |
| 6,769,067 B1* | 7/2004 | Soong | 726/2 |
| 7,117,246 B2* | 10/2006 | Christenson et al. | |
| 7,472,142 B2* | 12/2008 | Prahlad et al. | |
| 7,836,054 B2* | 11/2010 | Kawai et al. | 707/737 |
| 2004/0044735 A1* | 3/2004 | Hoblit | 709/206 |
| 2005/0283461 A1* | 12/2005 | Sell et al. | 707/1 |
| 2006/0190830 A1* | 8/2006 | Gerstl et al. | 715/757 |
| 2009/0204636 A1* | 8/2009 | Li et al. | 707/103 Y |
| 2009/0276732 A1* | 11/2009 | Dervan | 715/853 |
| 2009/0282086 A1* | 11/2009 | Heimes | 707/200 |

OTHER PUBLICATIONS

Breslau et al., "Saving E-mail Documents/Discussion Trends", Apr. 1999, IBM Techncial Disclosure Bulletin, article 420121.*

* cited by examiner

*Primary Examiner* — Alex Gofman
*Assistant Examiner* — Umar Mian
(74) *Attorney, Agent, or Firm* — Fisherbroyles LLP

(57) ABSTRACT

A computer-implemented method for archiving email messages may include 1) identifying a first email message that is subject to archival, 2) determining that the first email message is related to a second email message due to incorporating content that quotes a body of the second email message, and 3) archiving the first email message by (i) creating a data object storing the content that quotes the body of the second email message and (ii) replacing the content that quotes the body of the second email message within the first email message with a reference to the data object. Various other methods, systems, and computer-readable media are also disclosed.

18 Claims, 6 Drawing Sheets

SYSTEMS AND METHODS FOR ARCHIVING EMAIL MESSAGES

BACKGROUND

Data deduplication may reduce the amount of storage space used in a storage system by detecting and preventing redundant copies of data from being stored to the storage system. For example, if multiple instances of a file exist in a deduplicated file system, a deduplicated data system may store a single instance of the file and link all instances of the file to the single stored instance. Data deduplication techniques may be useful in a variety of contexts, including archival storage.

Unfortunately, traditional data deduplication techniques may perform poorly with some data formats. For example, email messages may contain significant amounts of duplicate information (e.g., one email message may quote another email message in entirety), but traditional data deduplication techniques may fail to exploit the duplicate information in email messages. For example, a short reply quoting a long email message may add little new information yet still be distinct from the quoted email message and so may not be de-duplicable with the quoted email message. Alternatively, a traditional deduplication system may divide the short reply and the long quoted email into smaller chunks and/or blocks for individual deduplication—but the chunks of the long quoted email may be unlikely to line up with the quoted portion of the short reply, again defeating deduplication efforts. Accordingly, the instant disclosure identifies and addresses a need for additional systems and methods for archiving email messages.

SUMMARY

As will be described in greater detail below, the instant disclosure generally relates to systems and methods for archiving email messages by identifying quoted content in emails and separately archiving the quoted content. These systems and methods may then deduplicate the bodies of original emails with the quoted content of emails that quote the original emails. In one example, a computer-implemented method for archiving email messages may include 1) identifying a first email message that is subject to archival, 2) determining that the first email message is related to a second email message due to incorporating content that quotes a body of the second email message, and 3) archiving the first email message by (i) creating a data object storing the content that quotes the body of the second email message and (ii) replacing the content that quotes the body of the second email message within the first email message with a reference to the data object.

In some examples, determining that the first email message is related to the second email message may include determining that the first email message includes a reply to the second email message and/or a forwarding of the second email message.

In one embodiment, replacing the text that quotes the body of the second email message within the first email message with the reference may include adding the data object as an attachment to the first email message. In this embodiment, the computer-implemented method may also include adding the data object as an attachment to the second email message in place of the body of the second email message.

In one example, the computer-implemented method may also include 1) determining a number of mailboxes including at least one email message comprising the data object and 2) based at least in part on the number of mailboxes, maintaining at least one additional copy of the data object for retrieval performance.

In some embodiments, the computer-implemented method may also include 1) identifying the second email message and 2) replacing the body of the second email message with the reference to the data object. In some examples, the computer-implemented method may also include 1) identifying the second email message, 2) creating an additional data object storing the body of the second email message, and 3) replacing the body of the second email message within the second email message with an additional reference to the additional data object. In these examples, the computer-implemented method may also include deduplicating the data object and the additional data object.

In one embodiment, a system for implementing the above-described method may include 1) an identification module programmed to identify a first email message that is subject to archival, 2) a determination module programmed to determine that the first email message is related to a second email message due to incorporating content that quotes a body of the second email message, and 3) an archival module programmed to archive the first email message by (i) creating a data object storing the content that quotes the body of the second email message and (ii) replacing the content that quotes the body of the second email message within the first email message with a reference to the data object. The system may also include at least one processor configured to execute the identification module, the determination module, and the archival module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a first email message that is subject to archival, 2) determine that the first email message is related to a second email message due to incorporating content that quotes a body of the second email message, and 3) archive the first email message by (i) creating a data object storing the content that quotes the body of the second email message and (ii) replacing the content that quotes the body of the second email message within the first email message with a reference to the data object.

As will be explained in greater detail below, by identifying quoted content in emails and separately archiving the quoted content, the systems and methods described herein may achieve single-instance storage of significant portions of redundant content across emails (e.g., between emails and replies to the emails and/or forwardings of the emails).

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
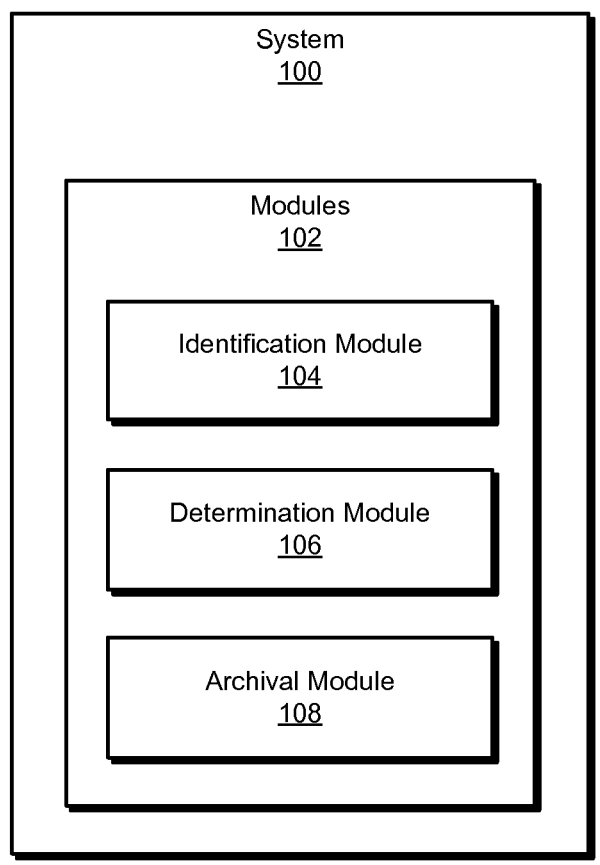
FIG. 1 is a block diagram of an exemplary system for archiving email messages.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
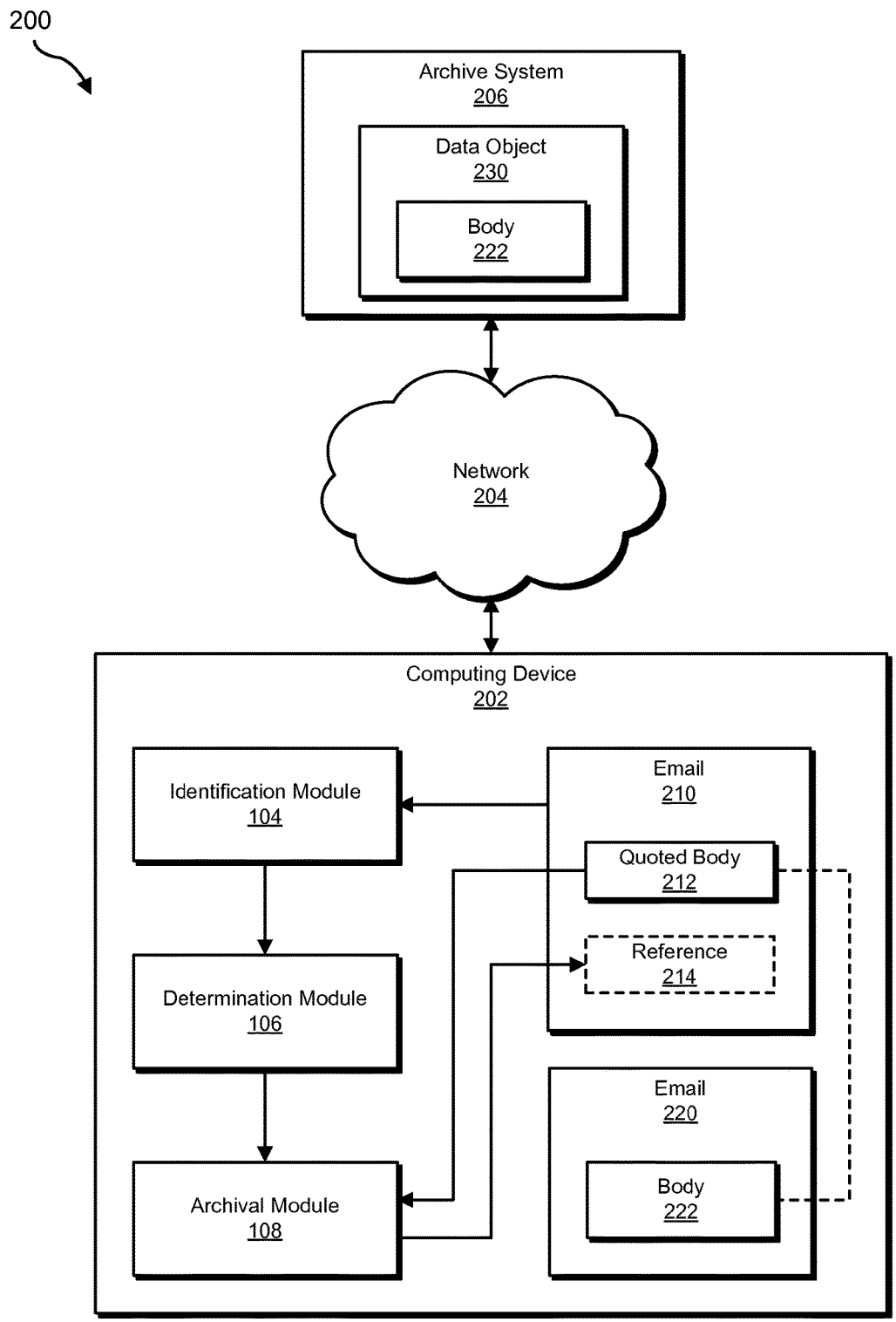
FIG. 2 is a block diagram of an exemplary system for archiving email messages.
Figure 3:
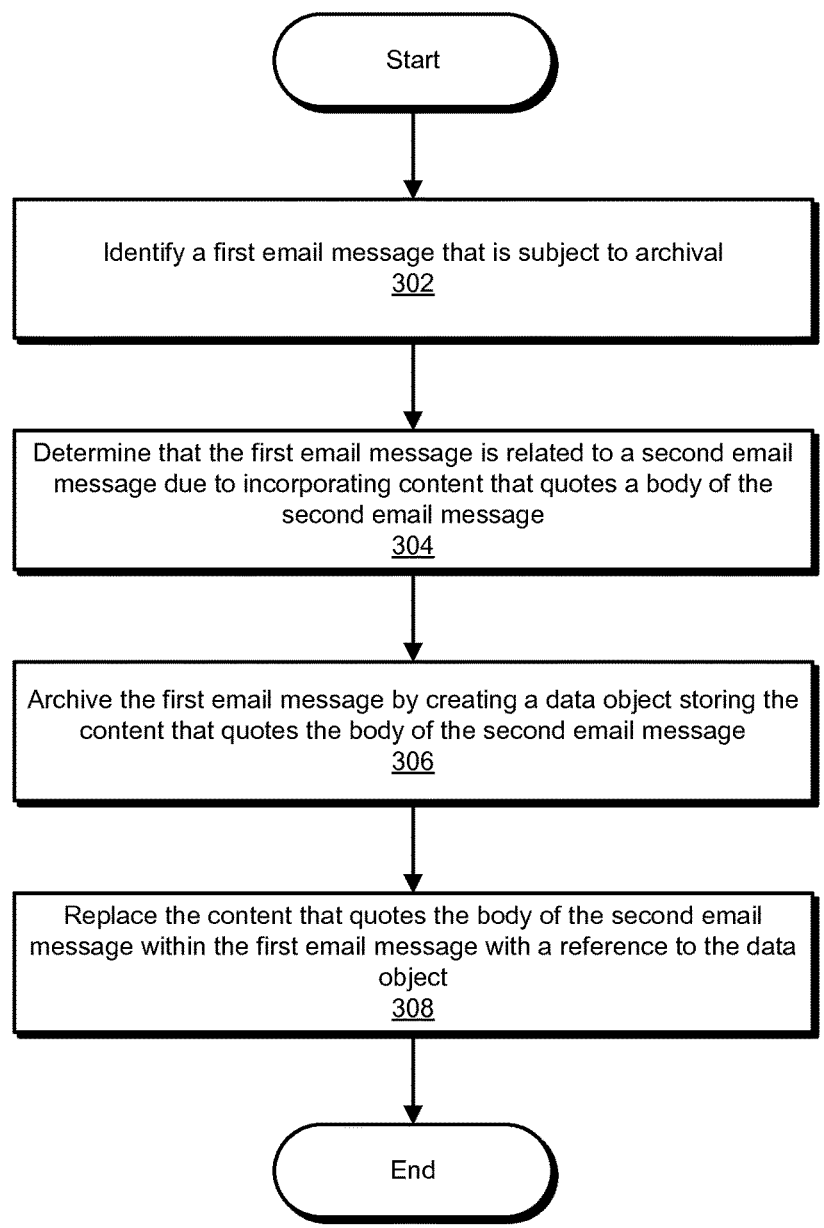
FIG. 3 is a flow diagram of an exemplary method for archiving email messages.
Figure 4:
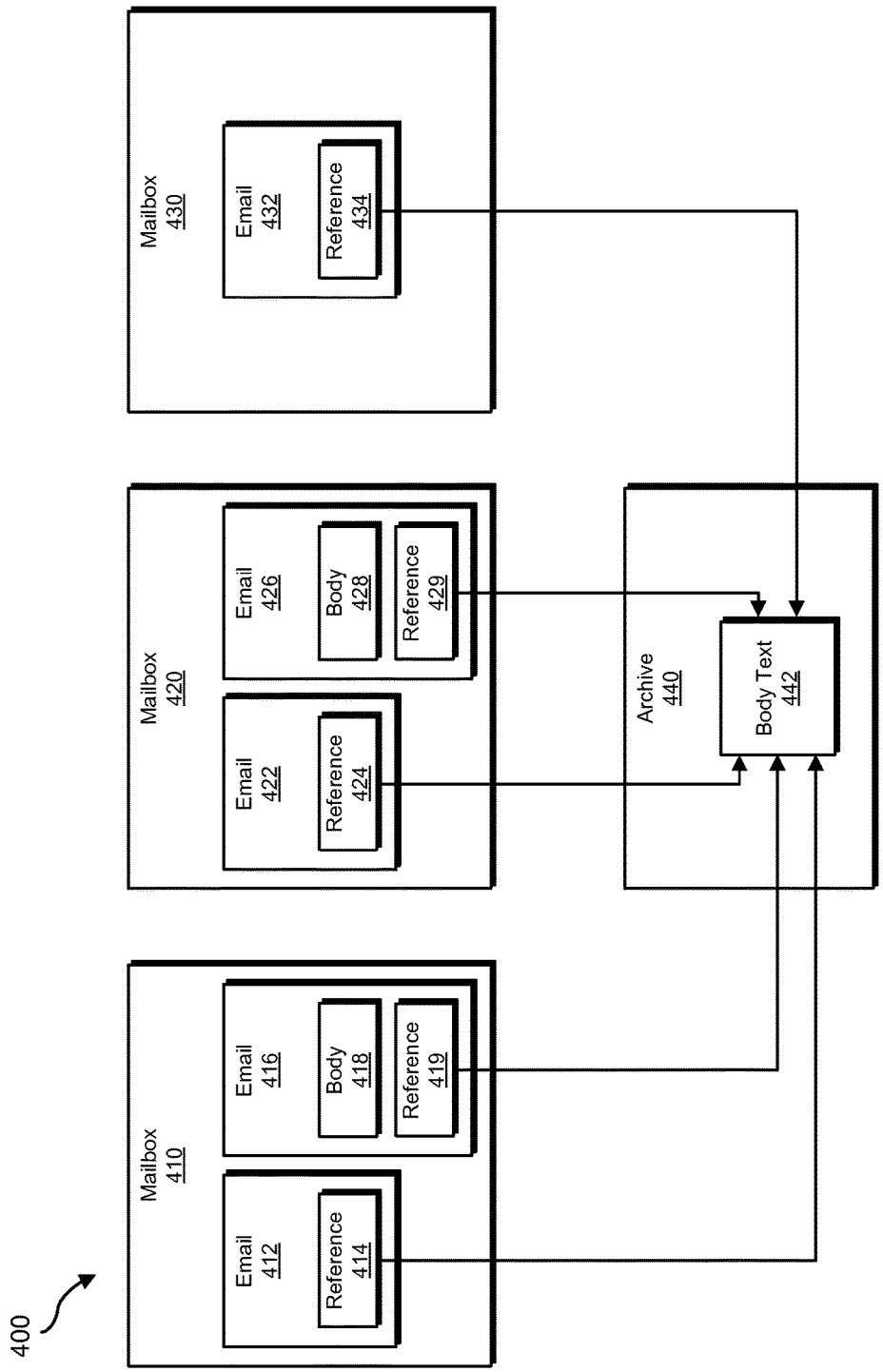
FIG. 4 is a block diagram of an exemplary system for archiving email messages.

The following will provide, with reference to FIGS. 1, 2, and 4, detailed descriptions of exemplary systems for archiving email messages. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for archiving email messages. As illustrated in this figure, exemplary system 100 may include one or more modules 102 for performing one or more tasks. For example, and as will be explained in greater detail below, exemplary system 100 may include an identification module 104 programmed to identify a first email message that is subject to archival. Exemplary system 100 may also include a determination module 106 programmed to determine that the first email message is related to a second email message due to incorporating content that quotes a body of the second email message.

In addition, and as will be described in greater detail below, exemplary system 100 may include an archival module 108 programmed to archive the first email message by creating a data object storing the content that quotes the body of the second email message and replacing the content that quotes the body of the second email message within the first email message with a reference to the data object. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or archive system 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with an archive system 206 via a network 204. For example, computing device 202 may be configured to archive data via archive system 206.

In one embodiment, one or more of modules 102 from FIG. 1 may, when executed by at least one processor of computing device 202, facilitate computing device 202 in archiving email messages. For example, and as will be described in greater detail below, one or more of modules 102 may cause computing device 202 to 1) identify an email 210 that is subject to archival (e.g., on archive system 206), 2) determine that email 210 is related to an email 220 due to incorporating content (e.g., quoted body 212) that quotes a body 222 of email 220, and 3) archive email 210 by (i) creating a data object 230 storing body 222 of email 220 and (ii) replacing quoted body 212 that quotes body 222 of email 220 within email 210 with a reference 214 to data object 230.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 510 in FIG. 5, or any other suitable computing device.

Archive system 206 generally represents any type or form of computing device that is capable of storing, processing, moving, and/or providing archived data. Examples of archive system 206 include, without limitation, application servers and database servers configured to provide various database services and/or run certain software applications. Archive system 206 may represent portions of a single storage or computing device or a plurality of storage or computing devices.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and archive system 206.

FIG. 3 is a flow diagram of an exemplary computer-implemented method 300 for archiving email messages. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a first email message that is subject to archival. For example, at step 302 identification module 104 may, as part of computing device 202 in FIG. 2, identify email 210 that is subject to archival (e.g., on archive system 206).

As used herein, the phrase "email message" and the term "email" generally may refer to any digital message and/or document that may be directed to a specified digital address, computing system, and/or person. For example, "email" may refer to a digital message transmitted via the Simple Mail Transfer Protocol (SMTP). Additionally or alternatively, "email" may refer to a digital message transmitted under a different protocol. In some examples, the term "email" may refer to a digital message sent, received, handled, and/or processed by a system capable of quoting and/or forwarding the digital message in a new digital message.

The term "archiving," as used herein, generally refers to any type of data transfer (or data storage) technique that involves migrating data from at least one computing (or storage) device to at least one additional computing (or storage) device and replacing the migrated data with a placeholder (e.g., a reference, a stub, etc.).

Identification module 104 may identify the first email message in any suitable manner. For example, identification module 104 may identify the first email message within a mailbox based on an archival policy specifying and/or including the mailbox. For example, the archival policy may specify that emails within the mailbox that are older than one year are subject to archiving. As used herein, the term "mailbox" may refer to any file, database, and/or digital store for email messages. In some examples, the term "mailbox" may refer to storage of email messages pertaining to a single user.

FIG. 4 illustrates an exemplary system 400 for archiving email messages. As shown in FIG. 4, exemplary system 400 may include mailboxes 410, 420, and 430, and an archive 440. Using FIG. 4 as an example, at step 302 identification module 104 may identify an email 416.

Returning in FIG. 3, at step 304 one or more of the systems described herein may determine that the first email message is related to a second email message due to incorporating content that quotes a body of the second email message. For example, at step 304 determination module 106 may, as part of computing device 202 in FIG. 2, determine that email 210 is related to email 220 due to incorporating content (e.g., quoted body 212) that quotes body 222 of email 220.

As used herein, the term "body" as used in reference to email messages may refer to the primary content of an email message, the payload of an email, and/or a portion of an email message intended for display to a user. In some examples, the body of an email may include textual data (e.g., a plain text message). In another example, the body of an email may include Rich Text Format (RTF) content. Additionally or alternatively, the body of an email may include HyperText Markup Language (HTML) and/or other markup language data.

Determination module 106 may determine that the first email message is related to the second email message in any of a variety of ways. For example, determination module 106 may determine that the first email message includes a reply to the second email message and/or a forwarding of the second email message. In some examples, determination module 106 may determine that the first email message is related to the second email message based on metadata within the first email message identifying the second email message. For example, determination module 106 may identify an email message header with a field specifying an identifier of the second email message (e.g., a "In-Reply-To" field according to the Internet Message Format).

In some examples, determination module 106 may determine that the first email message is related to another email message (i.e., the second email message) by identifying quoted content within the first email message. For example, determination module 106 may identify hidden metadata and/or formatting data indicating that content is quoted from another email message. Additionally or alternatively, determination module 106 may parse the first email message and identify a reply header that provides information about quoted content that follows (e.g., an original sender, an original recipient, a date, and/or a title of an original email message). In some examples, determination module 106 may parse the first email message and identify one or more delimiters indicating quoted content. Additionally or alternatively, determination module 106 may compare the quoted content to the second email message to verify that the first and second email messages are related.

Using FIG. 4 as an example, at step 304 determination module 106 may determine that email 416 is related to an email 422 due to email 416 incorporating content that quotes the body of email 422.

Returning in FIG. 3, at step 306 one or more of the systems described herein may archive the first email message by creating a data object storing the content that quotes the body of the second email message. For example, at step 306 archival module 108 may, as part of computing device 202 in FIG. 2, archive email 210 by creating data object 230 storing body 222 of email 220.

Archival module 108 may create the data object in any suitable manner. For example, archival module 108 may create a file storing the body of the second email message. In some examples, archival module 108 may store the data object (e.g., the file) within a deduplicated storage system used by an archiving system. In this example, the deduplicated storage system may automatically deduplicate the data object with other archived data objects with the same content (e.g., the body of the second email message). For example, in some examples archival module 108 may archive the second email message by replacing the body of the second email message with a reference to another data object containing the body of the second email message and store the other data object in the deduplicated storage system. In other examples, as will be explained in greater detail below, archival module 108 may replace the body of the second email message with a reference to the same data object as referenced by the first email message, thereby achieving deduplication of the data.

Using FIG. 4 as an example, at step 306 archival module 108 may replace the quoted body of email 412 within email 426 with a reference 429 to body text 442. Likewise, in some examples, archival module 108 may replace the body of email 412 with a reference 414 to body text 442. Similarly, archival module 108 may replace the quoted body of email 412 within emails 416 with a reference 419. Furthermore, archival module 108 may replace the bodies of emails 422 and 432 with references 424 and 434, respectively. For example, email 412 within mailbox 410 may represent an original email sent by an owner of mailbox 410. Emails 422 and 432 may represent the original email received by the owners of mailboxes 420 and 430, respectively. Email 426 may represent a reply (e.g., with a body 428) to email 422 by the owner of mailbox 420 to the owner of mailbox 410, received by the owner of mailbox 410 as an email 416 (e.g., with a body 418). Accordingly, each of emails 412, 416, 422, 426, and 432 may have included the body of email 412 before being replaced with references to body text 442.

Returning in FIG. 3, at step 308 one or more of the systems described herein may archive the first email message by replacing the content that quotes the body of the second email message within the first email message with a reference to the data object. For example, at step 308 archival module 108 may, as part of computing device 202 in FIG. 2, replacing quoted body 212 that quotes body 222 of email 220 within email 210 with reference 214 to data object 230.

As used herein, the term "reference" may refer to any stub, link, attachment indicator, identifier, and/or metadata for logically incorporating data in an email without storing a local copy of the data. Archival module 108 may replace the content with the reference in any of a variety of ways. For example, archival module 108 may add the data object as an attachment to the first email message. In this example, the attachment may include an identifier of the body text of the second email message (e.g., as archived). Likewise, archival module 108 may add the data object as an attachment to the second email message in place of a body of the second email message. Accordingly, archival module 108 may include the same identifier of the body text of the second email message in the attachment to the second email message.

In some examples, the systems and methods described herein may deduplicate information across mailboxes. For example, an email message may be stored as a sent message within a first mailbox and stored as a received message within a second mailbox. A new email message quoting the original email message may be stored as sent within the second mailbox and as a received message within a third mailbox. In this example, three mailboxes may include five instances of the body of the original email message, and the systems and methods described herein may deduplicate all five instances. However, in some examples, dozens or hundreds of mailboxes may all contain instances of an email message body. In this example, one or more of the systems described herein may maintain multiple copies of the email message body for retrieval. For example, archival module 108 may determine a number of mailboxes including at least one email message including the data object. Archival module 108 may then, based at least in part on the number of mailboxes, maintain at least one additional copy of the data object for retrieval purposes. By maintaining multiple copies of the data object, archival module 108 may ensure that the data object may be efficiently retrieved even if it is referenced within hundreds of mailboxes.

As mentioned earlier, in some examples one or more of the systems described herein may replace the body of the second email message with a reference. For example, archival module 108 may identify the second email message and then replace the body of the second email message with the same reference to the data object included in the first email message. Additionally or alternatively, archival module 108 may identify the second email message and then create an additional data object storing a body of the second email message. Archival module 108 may then replace the body of the second email message within the second email message with an additional reference (e.g., to the additional data object). In these examples, one or more of the systems described herein (e.g., archival module 108) may then deduplicate the data object and the additional data object (e.g., by storing both the data object and the additional data object in a deduplicated storage system). The term "deduplication," as used herein, may refer to one or more operations related to reducing the amount of storage space used in a data storage system, including operations for detecting and preventing data from being redundantly stored within a storage system. For example, data deduplication may reduce the amount of storage space used in a data storage system by detecting and removing redundant copies of data in the data storage system (and, e.g., replacing the redundant copies with references to a single copy).

As explained above, by identifying quoted content in emails and separately archiving the quoted content, the systems and methods described herein may achieve single-instance storage of significant portions of redundant content across emails (e.g., between emails and replies to the emails and/or forwardings of the emails).

Figure 5:
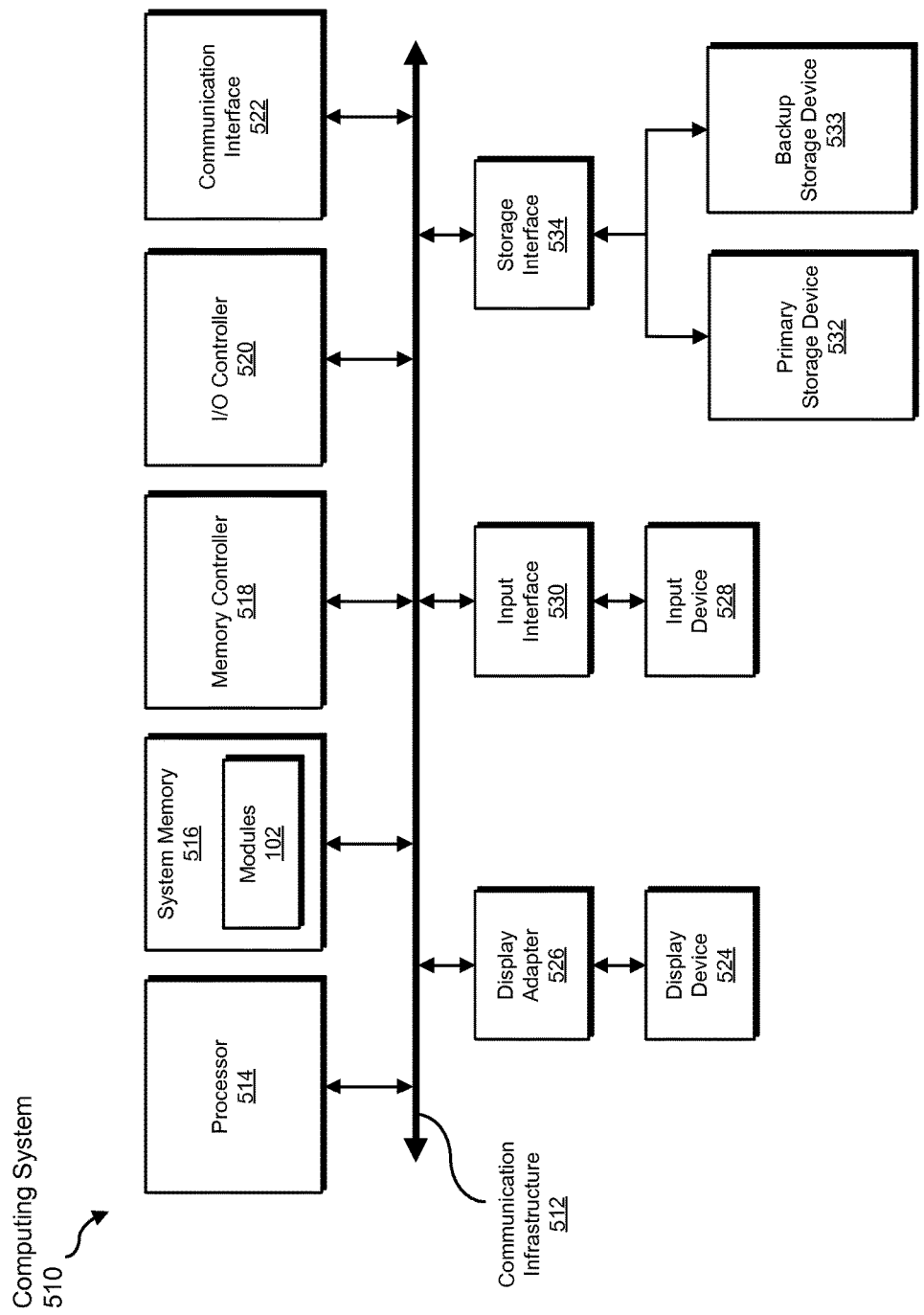
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, determining, archiving, creating, replacing, adding, and deduplicating steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
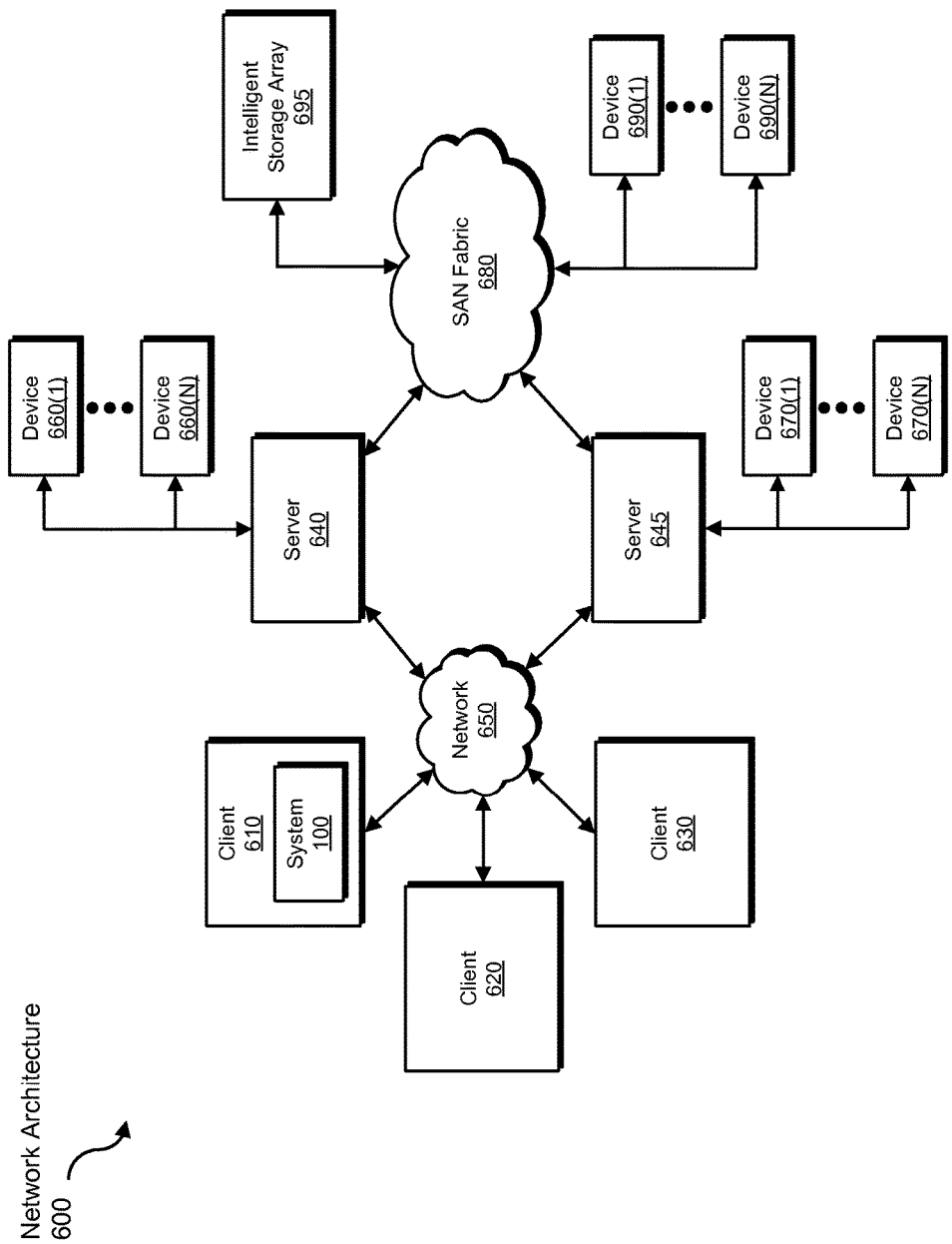
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, determining, archiving, creating, replacing, adding, and deduplicating steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for archiving email messages.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for efficiently archiving email messages. As another example, one or more of the modules recited herein may transform two or more email messages into email messages referencing deduplicated data.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for archiving email messages, at least a portion of the method being performed by a computing device comprising at least one processor, the method comprising:
   identifying a follow-up email message that is subject to archival;
   determining that the follow-up email message is related to an original email message by incorporating content that quotes a body of the original email message;
   archiving the follow-up email message within an archive system by:
      creating a data object storing the content that quotes the body of the original email message;
      adding, by the archive system, the data object as an attachment to the follow-up email message after the follow-up email message has been received;
      replacing the content within the follow-up email message that quotes the body of the original email message with a reference to the data object added as the attachment to the follow-up email message by the archive system.

2. The computer-implemented method of claim 1, further comprising:
   identifying the original email message;
   replacing the body of the original email message with the reference to the data object.

3. The computer-implemented method of claim 1, further comprising:
   identifying the original email message;
   creating an additional data object storing the body of the original email message;
   replacing the body of the original email message within the original email message with an additional reference to the additional data object.

4. The computer-implemented method of claim 3, further comprising deduplicating the data object and the additional data object.

5. The computer-implemented method of claim 1, further comprising adding the data object as an attachment to the original email message in place of the body of the original email message.

6. The computer-implemented method of claim 1, further comprising:
   determining a number of mailboxes including at least one email message comprising the data object;
   based at least in part on the number of mailboxes, maintaining at least one additional copy of the data object for retrieval performance.

7. The computer-implemented method of claim 1, wherein determining that the follow-up email message is related to the original email message comprises determining that the follow-up email message comprises at least one of:
   a reply to the original email message;
   a forwarding of the original email message.

8. A system for archiving email messages, the system comprising:
   an identification module programmed to identify a follow-up email message that is subject to archival;
   a determination module programmed to determine that the follow-up email message is related to an original email message by incorporating content that quotes a body of the original email message;
   an archival module programmed to archive the follow-up email message within an archive system by:
      creating a data object storing the content that quotes the body of the original email message;
      adding, by the archive system, the data object as an attachment to the follow-up email message after the follow-up email message has been received;
      replacing the content within the follow-up email message that quotes the body of the original email message with a reference to the data object added as the attachment to the follow-up email message by the archive system;
   at least one processor configured to execute the identification module, the determination module, and the archival module.

9. The system of claim 8, wherein the archival module is further programmed to:
   identify the original email message;
   replace the body of the original email message with the reference to the data object.

10. The system of claim 8, wherein the archival module is further programmed to:
    identify the original email message;
    create an additional data object storing the body of the original email message;
    replace the body of the original email message within the original email message with an additional reference to the additional data object.

11. The system of claim 10, wherein the archival module is further programmed to deduplicate the data object and the additional data object.

12. The system of claim 8, wherein the archival module is further programmed to add the data object as an attachment to the original email message in place of the body of the original email message.

13. The system of claim 8, wherein the archival module is further programmed to:
    determine a number of mailboxes including at least one email message comprising the data object;
    maintain, based at least in part on the number of mailboxes, at least one additional copy of the data object for retrieval performance.

14. The system of claim 8, wherein the determination module is programmed to determine that the follow-up email message is related to the original email message by determining that the follow-up email message comprises at least one of:
- a reply to the original email message;
- a forwarding of the original email message.

15. A non-transitory computer-readable-storage medium comprising one or more computer-executable instructions that, when executed by at least one processor of a computing device, cause the computing device to:
- identify a follow-up email message that is subject to archival;
- determine that the follow-up email message is related to an original email message by incorporating content that quotes a body of the original email message;
- archive the follow-up email message within an archive system by:
  - creating a data object storing the content that quotes the body of the original email message;
  - adding, by the archive system, the data object as an attachment to the follow-up email message after the follow-up email message has been received;
  - replacing the content within the follow-up email message that quotes the body of the original email message with a reference to the data object added as the attachment to the follow-up email message by the archive system.

16. The computer-readable-storage medium of claim 15, wherein the one or more computer-executable instructions further cause the computing device to:
- identify the original email message;
- replace the body of the original email message with the reference to the data object.

17. The computer-readable-storage medium of claim 15, wherein the one or more computer-executable instructions further cause the computing device to:
- identify the original email message;
- create an additional data object storing the body of the original email message;
- replace the body of the original email message within the original email message with an additional reference to the additional data object.

18. The computer-readable-storage medium of claim 17, wherein the one or more computer-executable instructions further cause the computing device to deduplicate the data object and the additional data object.

* * * * *